(12) United States Patent
Kamiya

(10) Patent No.: US 6,785,908 B1
(45) Date of Patent: Aug. 31, 2004

(54) TAP DEVICE OF CABLE BROADCASTING SYSTEM

(76) Inventor: Nobuhiro Kamiya, c/o Masprodenkoh Kabushikikaisha 80, Johnoh, Asada-cho, Nisshin-shi, Aichi-ken, 470-0194 (JP)

(*) Notice: Subject to any disclaimer, the term of this patent is extended or adjusted under 35 U.S.C. 154(b) by 0 days.

(21) Appl. No.: 09/452,780

(22) Filed: Dec. 2, 1999

(30) Foreign Application Priority Data

Dec. 4, 1998 (JP) .......................................... 10-345564

(51) Int. Cl.[7] .......................... H04N 7/173; H04N 7/16
(52) U.S. Cl. ...................... 725/149; 725/150; 725/127; 725/130
(58) Field of Search .................. 725/127, 128, 725/149, 150, 148, 118, 119, 98, 25, 130; 323/247; 307/82; 340/310.01, 310.06, 310.07; H04W 7/173, 7/16

(56) References Cited

U.S. PATENT DOCUMENTS

| | | | |
|---|---|---|---|
| 4,577,224 A | * | 3/1986 | Ost .............................. 725/127 |
| 5,109,286 A | * | 4/1992 | West, Jr. et al. ............. 725/127 |
| 5,675,372 A | * | 10/1997 | Aguayo, Jr. et al. ......... 725/127 |
| 5,729,824 A | * | 3/1998 | O'Neill et al. ............... 725/127 |

* cited by examiner

Primary Examiner—Vivek Srivastava
(74) Attorney, Agent, or Firm—Davis & Bujold, P.L.L.C.

(57) ABSTRACT

A power supply circuit in the tap device includes a first power supply circuit for generating a first power voltage of DC 24V to drive output switching relays, and a second power supply circuit for generating a second power voltage of DC 5V to be supplied to a receiving circuit and a microcomputer. The second power supply circuit lowers the voltage of the alternating-current power signal from the transmission line with a transformer, rectifies and smoothes the power signal with the lowered voltage, then generates the power voltage using a three-terminal regulator. The tap device can be used in CATV systems with different voltages of the alternating-current power signal employed, a power loss generated in the system with a high voltage is reduced, and the power consumption of the tap device can be suppressed.

3 Claims, 2 Drawing Sheets

TAP DEVICE OF CABLE BROADCASTING SYSTEM

BACKGROUND OF THE INVENTION (i) Field of the Invention

The present invention relates to a tap device of a cable broadcasting system in which a part of transmission signal running through a transmission line leading to a terminal side from a center apparatus is branched and transmitted to a subscriber's terminal device, particularly to a tap device of a cable broadcasting system in which it can be switched on the side of the center apparatus whether or not the transmission signal is transmitted to the terminal device.

(ii) Description of the Related Art

In a conventional cable broadcasting system such as CATV system in which a broadcasting signal such as a television signal is transmitted to a subscriber's terminal device via one transmission line formed of a coaxial cable, and the like, the transmission line is provided with a tap device, so-called tap-off, for leading signals in order to branch the broadcasting signal from the transmission line and leading the signal into a subscriber's house.

Moreover, in a known tap device, it can easily be switched according to a subscriber's request or the like whether or not the broadcasting signal is distributed to the subscriber's house. Specifically, the tap device is provided with a relay disposed in a signal path between a directional coupler for branching a part of the broadcasting signal from the transmission line and a branched output terminal for outputting the branched broadcasting signal toward the subscriber's terminal device, in which a high-frequency broadcasting signal can be passed with a reduced loss. The relay is a so-called high-frequency relay, and a latching relay which can hold a switched state is usually used. By driving the relay in response to a command signal transmitted from the center apparatus via the transmission line, the connected/disconnected state of the signal path, in other words, the output or cut-off of the broadcasting signal to the terminal device can easily be switched on the side of the center apparatus.

When the conventional tap device is installed on the transmission line, an individual address is allocated to the device in order to distinguish the device from the other electronic apparatuses connected to the transmission line. Additionally, when the center apparatus switches the output of the broadcasting signal to the branched output terminal of the tap device, a command signal including command data and the individual address of the tap device is generated. This command signal is sent to the transmission line. In this case, on the side of the tap device, the command signal having the corresponding address is selected from various command signals transmitted via the transmission line, that is, the command signal from the center apparatus is extracted. By driving the relay based on a command included in the command signal, it is switched whether or not to transmit the broadcasting signal to the branched output terminal.

Therefore, according to the conventional tap device, it can easily be switched on the side of the center apparatus whether or not to transmit the broadcasting signal to the subscriber's terminal device from the branched output terminal. Therefore, an operator does not have to go to a place where the tap device is installed for the switching operation.

Additionally, in the conventional tap device, in order to receive the command signal from the center apparatus to drive the relay, electric power has to be supplied from the outside for the switching operation. Furthermore, it is troublesome to place a separate cable for the power supply, which enormously increases costs.

In the cable broadcasting systems such as CATV system, the power is usually supplied to the electronic apparatuses such as an amplifier connected to the transmission line via the transmission line. Basically, the broadcasting signals or high-frequency signals such as television signals are transmitted via the transmission line. However, by using a frequency band different from that of the broadcasting signal, the above-described command signal and the power signal can simultaneously be transmitted. Therefore, in the conventional system, by supplying an alternating-current power signal of several tens of Hz(hertz) to the transmission line with several tens of V(volts), the alternating-current power signal is used to supply electric power to various electronic apparatuses connected to the transmission line.

For this purpose, the tap device is usually provided with a power supply circuit in which the alternating-current power signal supplied to the transmission line is taken into the device, and rectified and smoothed to generate a direct-current voltage for operating an inner circuit. With the direct-current voltage generated by the power supply circuit, a drive circuit for driving the relay, a receiving circuit for receiving the command signal, a control circuit for turning on/off the relay via the drive circuit based on the received command signal, and the like are operated.

In the receiving circuit and the control circuit of the conventional tap device, semiconductor integrated circuits can be used, and the operation voltage can be set to a low voltage of 5V or 3.3V as in a general one-chip microcomputer. However, a high voltage is advantageous for the relay switch, because the relay can be driven with less current.

Therefore, the power supply circuit to be incorporated into the tap device is preferably constituted such that a direct-current high voltage of 10V or more (hereinafter referred to as the first power voltage) is supplied to the relay drive circuit, and that a direct-current low voltage lower than the first power voltage (hereinafter referred to as the second power voltage) can be supplied to the receiving circuit and the control circuit.

In the conventional tap device, for example, the power supply circuit is constituted so as to rectify/smooth the alternating-current power signal transmitted via the transmission line, then generate the first power voltage using a three-terminal regulator, a Zener diode, and the like, and further to generate the second power voltage for driving the control circuit from the first power voltage.

On the other hand, since each cable broadcasting system in each service area is independent, the alternating-current power signal supplied to the transmission line differs in each system, and the voltage of the alternating-current power signal differs by about several tens of V(volts) among systems. Therefore, when the tap device is used only in a specific system in which the alternating-current power is constant, the power supply circuit to be incorporated into the tap device may be designed in accordance with the alternating-current power to be used so that the power loss is minimized. However, when the tap device is provided with general-purpose properties so that the tap device of the same specification can be used in the systems different from one another in terms of the voltage of the alternating-current power, a problem arises that the power loss in the power supply circuit is increased in the system with a high voltage.

Specifically, for example, when the common tap device is used in the systems in which the voltages of the alternating-current power signals are 45V and 90V, the power supply circuit needs to generate the first and second power voltages in the range of the alternating-current power signal of 45V to 90V. In this case, the power supply circuit has to be designed such that even when the voltage of the alternating-current power signal is 45V, the first and second power voltages can be generated and that when the voltage of the alternating-current power signal is 90V, the power for the voltage difference is consumed by the three-terminal regulator, the Zener diode, and other components forming the power supply circuit. Therefore, when the conventional tap device can be utilized in the systems different from one another in terms of the voltage of the alternating-current power signal running through the transmission line, the power loss in the power supply circuit is increased in the system in which the voltage of the alternating-current power signal is high.

When the power loss in the power supply circuit is increased as described above, another problem arises that the thermal emission from the power supply circuit is increased to adversely affect the operations of the receiving circuit and the control circuit, or that the power consumption of the entire system is increased and the power capacity of the power supply circuit for supplying the alternating-current power signal to the transmission line has to be enlarged.

Although, it can be considered to solve these problems that a switching regulator excellent in conversion efficiency is used in the power supply circuit, such a switching regulator has a complicated constitution and is expensive. Additionally, since switching noises are generated during the voltage converting operation, the switching regulator cannot be employed in the tap device of the cable broadcasting system. Specifically, in the tap device, the high-frequency broadcasting signals are received and transmitted. Therefore, if the switching regulator is incorporated, the switching noises are superimposed to the broadcasting signals transmitted to the transmission line and the subscriber's terminal device from the tap device, thereby deteriorating the broadcasting signals. Therefore, the switching regulator cannot be incorporated into the tap device.

SUMMARY OF THE INVENTION

Wherefore, an object of the present invention is to provide a tap device for a cable broadcasting system, which can switch between outputting and stopping a broadcasting signal via a branched output terminal in response to a command signal transmitted from a center apparatus via a transmission line for transmitting the broadcasting signal, which receives an electric power for the switching operation via the transmission line, which can be used in systems different in voltage of power signal, and which reduces power loss in a power supply circuit generated by the difference in voltage.

To attain this and other objects, according to one aspect of the present invention, in the same manner as in the conventional tap device, there is provided a tap device which is connected to a transmission line for transmitting a broadcasting signal to a terminal side from a center apparatus, and which is provided with a directional coupler for branching a part of a transmission signal including the broadcasting signal on the transmission line and transmitting the branched transmission signal to terminal devices via branched output terminals. Moreover, a signal path for leading the branched transmission signal to the branched output terminal from the directional coupler is provided with a latching relay for switching the connected/disconnected state of the path, and the latching relay can be driven or switched on/off via a drive circuit. Additionally, the latching relay is a known relay also called a keep relay or a holding relay. By energizing a relay coil, the position of a movable contact can be switched. After the switching, even if the electricity to the relay coil is cut off, the position of the movable contact can be self-retained.

On the other hand, in the tap device of the present invention, a receiving circuit receives a command signal transmitted from the center apparatus via the transmission line, a control circuit extracts the command signal for the tap device from the command signals received by the receiving circuit, a control signal is transmitted to a drive circuit based on the extracted command signal, and the connected/disconnected state of the signal path by the latching relay is switched. Therefore, when the broadcasting signal is distributed to a subscriber's house via the tap device connected to the transmission line of the cable broadcasting system, and the subscriber requests to temporarily stop off the distribution of the broadcasting signal, the output of the broadcasting signal to the subscriber's terminal device can be stopped by sending the command signal for turning off the latching relay of the tap device to the transmission line from the center apparatus.

In the tap device constituted as described above, in order to operate the receiving circuit, the control circuit, and the drive circuit, each circuit requires a power supply circuit for supplying the direct-current voltage. The tap device of the present invention is provided with two power supply circuits: a first power supply circuit for supplying a first power voltage to the drive circuit to drive the relay; and a second power circuit for supplying a second power voltage lower than the first power voltage to the receiving circuit and the control circuit to operate these circuits.

In the same manner as the power supply circuit of a conventional tap device, the power supply circuits generate the power voltages from the alternating-current power signal supplied to the transmission line in the present invention. However, the first power supply circuit rectifies/smoothes the alternating-current power signal supplied to the transmission line, and generates the first power voltage necessary for the drive circuit to drive the latching relay from the rectified/smoothed power signal. The second power supply circuit once lowers the voltage of the alternating-current power signal in a transformer, rectifies/smoothes the alternating-current power signal with the lowered voltage, and generates the second power voltage necessary for operating the receiving circuit and the drive circuit from the rectified/smoothed power signal.

Therefore, when the tap device of the present invention is used in the cable broadcasting systems with different alternating-current power signals employed, the power loss generated in the system in which the voltage of the alternating-current power signal is high is prevented from becoming remarkably large by the voltage change of the alternating-current power signal. Different from the conventional tap device, the power loss in the power supply circuit can be reduced.

Specifically, in the second power supply circuit of the present invention, after the voltage of the alternating-current power signal supplied to the transmission line is once lowered by using the transformer, the signal is rectified/smoothed, and the second power voltage is generated from the rectified/smoothed power signal. Therefore, the voltage change of the alternating-current power signal transmitted to the circuit portion or constant-voltage circuit for generating the second power voltage can be smaller as compared with when no transformer is used. As a result, the power loss generated in generating the second power voltage from the rectified/smoothed power signal can be reduced.

On the other hand, in the present invention, the first power supply circuit for generating the first power voltage to drive the relay is provided with no transformer, and the alternating-current power signal supplied to the transmission line is directly rectified/smoothed for the following reasons.

First, the first power voltage generated by the first power supply circuit is a power voltage for driving the latching relay to switch on/off the relay. Therefore, as the voltage is increased, the current passing through the relay coil at the time of driving the relay can be reduced, and the power consumption required for the switching of the latching relay can be reduced. Therefore, the first power voltage is preferably set to be as high as possible relative to the second power voltage, and it is preferable to directly rectify/smooth the alternating-current power signal without lowering the voltage of the alternating-current power signal in the transformer as in the second power supply circuit.

Moreover, when the voltage of the alternating-current power signal is not lowered with the transformer, the voltage change of the power signal transmitted to the constant-voltage circuit in which the first power voltage is generated from the rectified/smoothed power signal becomes larger than that in the second power supply circuit, and the power loss generated in the constant-voltage circuit is increased in the system in which the voltage of the alternating-current power signal is high. However, the latching relay is driven only when the command signal is transmitted to the tap device from the center apparatus and the ON/OFF state needs to be switched. Therefore, the power loss in the first power supply circuit is only temporarily generated when the latching relay is driven, and does not cause either thermal emission or the power consumption of the entire system to be increased.

As described above, according to the present invention, even if the range of allowable voltage of the alternating-current power signal to each power supply circuit is set wide in order to utilize the tap device in the systems with different voltages of the alternating-current power signal supplied to the transmission line employed, the thermal emission due to the power loss in the power supply circuit does not become a problem in the system in which the voltage of the alternating-current power signal is high. The power consumption of the tap device can be reduced.

Moreover, when the latching relay is driven, the relay coil can be energized with the first power voltage which is higher than the second power voltage, and the amount of the current running through the relay coil can be reduced. Therefore, the power consumption required for switching the latching relay can also be reduced.

Furthermore, since the transformer is used in the second power supply circuit, it can prevent surge voltages or noise signals generated by lightning and other disturbances from entering the second power supply circuit. Therefore, according to the present invention, in the second power supply circuit, a stable second power voltage can always be generated without being influenced by the disturbances, so that the receiving circuit and the control circuit can stably be operated.

Here, in each power supply circuit, since the first power voltage or the second power voltage is generated from the rectified/smoothed power signal, the constant-voltage circuit is incorporated. According to the present invention, the constant-voltage circuit of the first power supply circuit is constituted to control the first power voltage corresponding to the breakdown voltage of the Zener diode by applying a reverse bias to the Zener diode with the rectified/smoothed power signal, and the constant-voltage circuit of the second power supply circuit is constituted of a three-terminal regulator.

Specifically, the first power voltage is generated for the drive circuit to drive the latching relay. Even if the voltage level slightly fluctuates, the latching relay does not malfunction. Additionally, since the latching relay is temporarily driven, the power consumption of the tap device is not increased by the operation of the first power supply circuit. Therefore, in the tap device of the present invention, by constituting the constant-voltage circuit incorporated in the first power supply circuit with the constant-voltage circuit of the Zener diode, the first power supply circuit can inexpensively be realized.

On the other hand, the second power voltage is generated so as to operate the receiving circuit and the control circuit. If the voltage fluctuates, the circuits can malfunction in some cases. To solve the problem, in the tap device of the present invention, by using the three-terminal regulator which can generate a stable constant voltage as the constant-voltage circuit of the second power supply circuit, the second power voltage is stabilized.

According to the tap device of the present invention, in addition to the above-described effects, there can be provided effects that the second power voltage is stabilized more securely and the receiving circuit and the control circuit can be operated constantly normally, and that the first power supply circuit is constituted inexpensively and thus the cost of the tap device can be reduced.

On the other hand, the tap device of the present invention is provided with a spliting circuit for distributing the transmission signal branched by the directional coupler into a plurality of signals, and transmitting the distributed transmission signals via a plurality of branched output terminals. In this case, a plurality of latching relays are disposed in a plurality of signal paths connected to a plurality of branched output terminals from the splitting circuit. The control circuit controls the individual connected/disconnected states of the broadcasting signal paths by the latching relays via the drive circuit based on the command signal transmitted to the tap device from the center apparatus.

Specifically, according to the tap device of the present invention, the broadcasting signal can be distributed to a plurality of subscribers' terminal devices via the transmission line. Furthermore, since the signal paths leading to a plurality of branched output terminals from the splitting circuit are provided with the latching relays, by individually switching the ON/OFF states of the latching relays, it can be set whether or not to transmit the broadcasting signal to each subscriber connected to each branched output terminal. Therefore, according to the tap device of the present invention, the broadcasting signal can be distributed to a plurality of subscribers' terminal devices, and additionally the center apparatus side can switch the distributing/stopping of the broadcasting signal to each subscriber.

Also in this case, the first power voltage for driving the relay is generated in the first power supply circuit, and the second power voltage for operating the receiving circuit and the control circuit is generated in the second power supply circuit. Therefore, in the same manner as described above, the effects can be obtained that the power loss of the power supply circuit generated in the system with the high voltage of the alternating-current power signal can be reduced and the power consumption in the tap device can be suppressed.

BRIEF DESCRIPTION OF THE DRAWINGS

An embodiment of the present invention will now be described with reference to the drawings, wherein.

DETAILED DESCRIPTION OF THE PREFERRED EMBODIMENT

Figure 1:
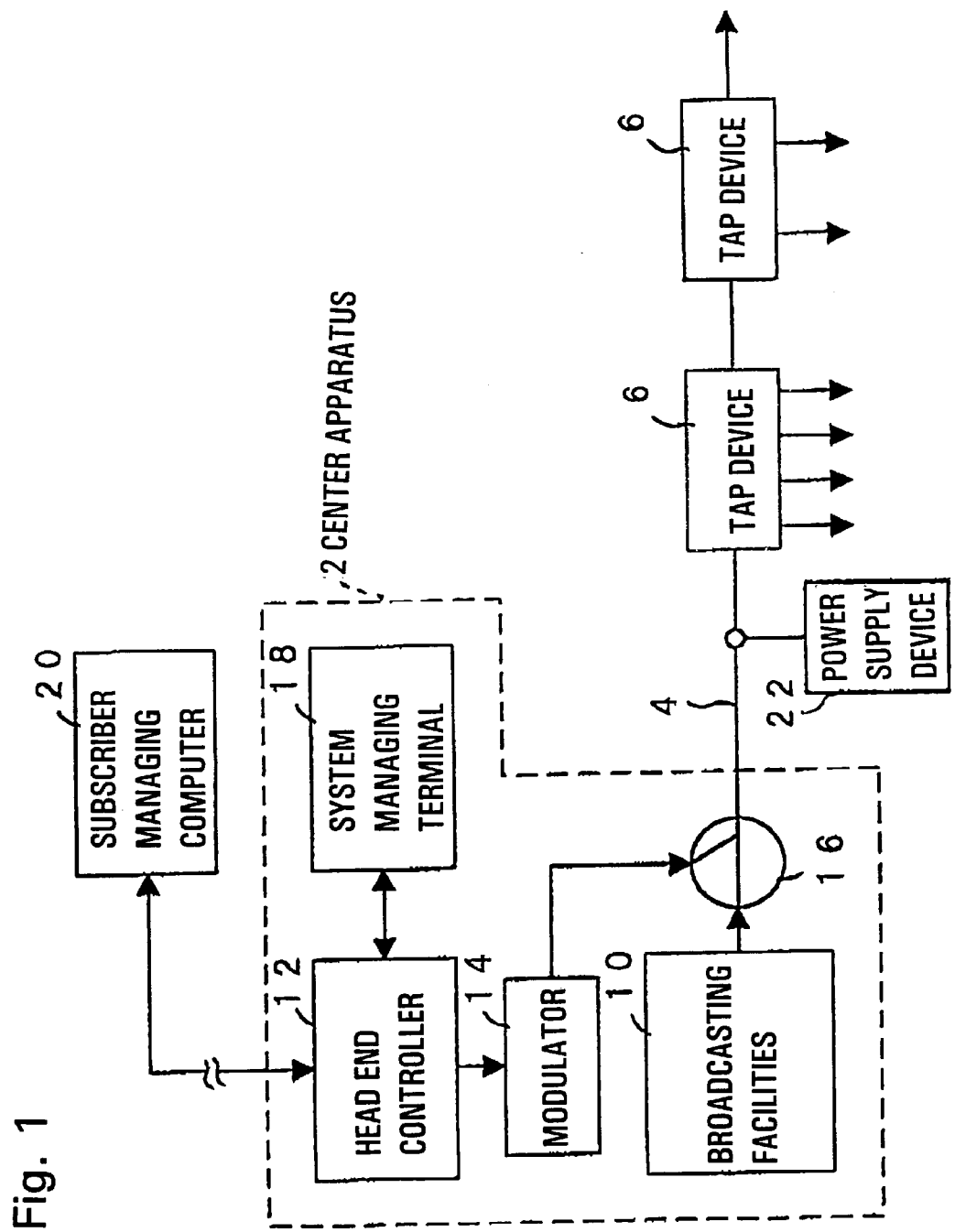
FIG. 1 is a block diagram showing the constitution of CATV system according to one embodiment of the present invention.

In the CATV system of the embodiment shown in FIG. 1, the broadcasting signal of a predetermined frequency band (e.g. 50 MHz to 770 MHz) is transmitted toward a terminal side from a center apparatus 2 via a transmission line 4, and the broadcasting signal is distributed to system subscribers' houses via a large number of tap devices 6 disposed on the transmission line 4.

The center apparatus 2 is provided with broadcasting facilities 10, in which a large number of television signals for broadcasting in the system are generated using a receiving antenna for receiving television broadcasting signals transmitted from artificial satellites or terrestrial stations, a video apparatus for reproducing television signals recorded in video tapes or video disks, a video camera for independent broadcasting, and the like, each television signal is converted to a broadcasting signal of a transmission frequency for predetermined channels, and the broadcasting signal is sent to the transmission line 4.

The center apparatus 2 is also provided with a head end controller 12 for generating transmission data including an address pre-allocated to each electronic apparatus and a command to transmit a command signal for controlling the operating states of the electronic apparatuses such as the tap devices 6 disposed on the transmission line 4; a modulator 14 for converting the transmission data from the head end controller 12 to a transmission command signal of the predetermined frequency band (e.g. 70 MHz) by FSK modulation; and a mixer 16 for mixing the command signal transmitted from the modulator 14 and the broadcasting signal transmitted from the broadcasting facilities 10 to send the mixed signal to the transmission line 4.

Additionally, the head end controller 12 generates the transmission data according to the command from a system managing terminal device or computer 18 disposed in the center apparatus 2, or a subscriber managing computer 20 connected via a telephone line, and the like, and transmits the command signal to various electronic apparatuses in the CATV system so as to control the operating states of the apparatuses. The head end controller 12 is constituted by a computer which has a communication function.

On the other hand, the transmission line 4 is connected to a power supply device 22 for supplying an operating power to the tap devices 6 on the transmission line 4, amplifiers (not shown), and the like. The power supply device 22 receives a power supply from a commercial power source to operate, and supplies an alternating-current signal, for example, with a frequency of 60 Hz, and a voltage of about 45 V to about 90V to the transmission line 4. In consideration of the power consumption, and the like of the electronic apparatus as a power supply object, a plurality of such power supply devices are disposed in places on the transmission line 4 at the rate of one unit for a plurality of electronic apparatuses.

Furthermore, the tap device 6 is a so-called tap-off disposed on the transmission line 4 in the CATV system such as a trunk directly connected to the center apparatus 2, a branch line branched from the trunk via a trunk branching amplifier, a tap device, and the like disposed on the trunk, and a spray line further branched from the branch line to distribute the broadcasting signal to the subscribers' terminal devices in the vicinity, and is provided with one or a plurality of branched output terminals. The tap device provided with four branched output terminals and the tap device provided with two branched output terminals are shown in FIG. 1.

Figure 2:
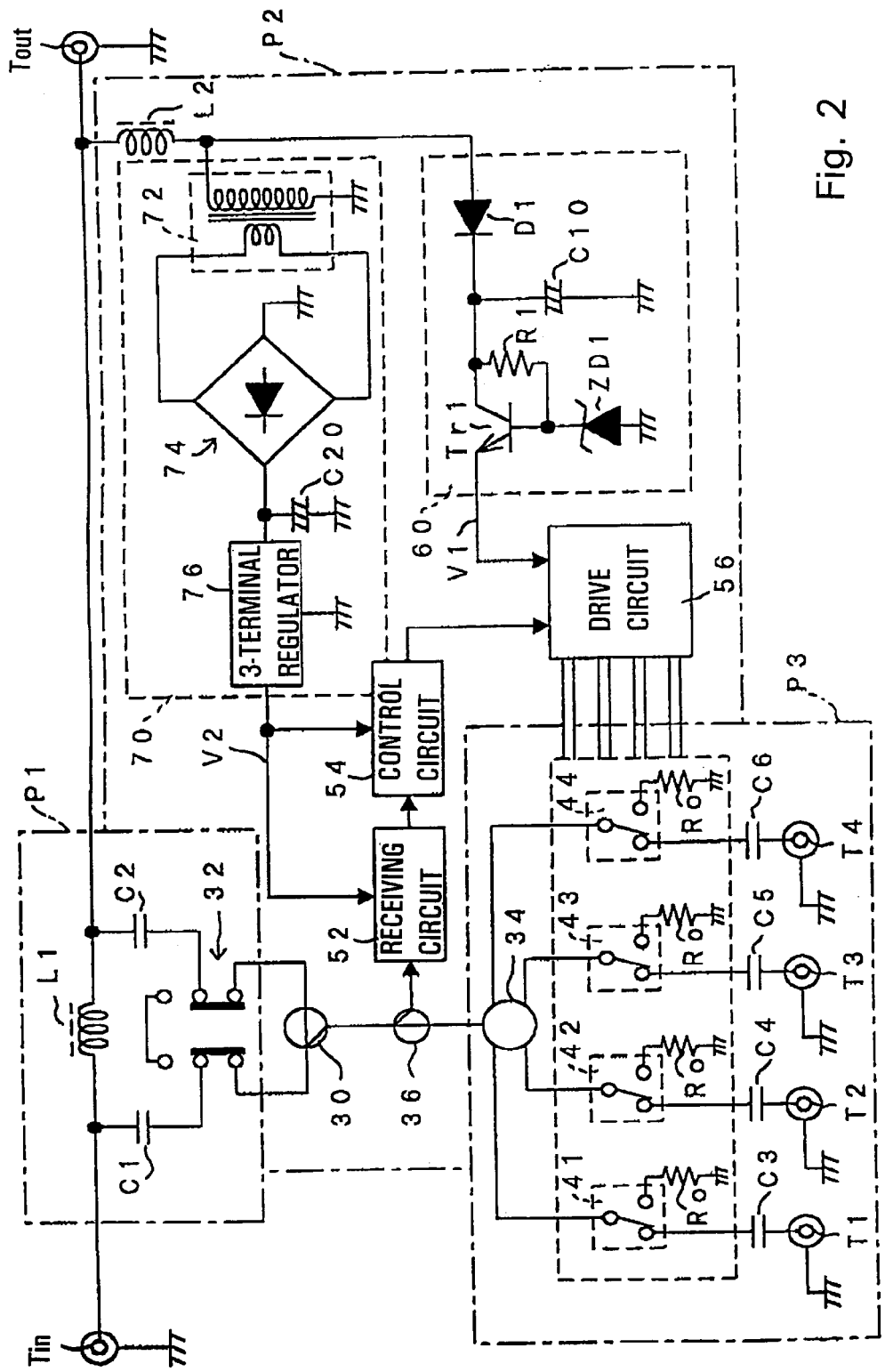
FIG. 2 is a circuit diagram showing the constitution of a tap device according to the embodiment.

As shown in FIG. 2, the tap device 6 is provided with an input terminal Tin connected to the side of the center apparatus 2 of the transmission line 4, an output terminal Tout connected to the terminal side of the transmission line 4, and a plurality of (four in the drawing) branched output terminals T1 to T4. Additionally, a choke coil L1 is connected between the input terminal Tin and the output terminal Tout for passing the alternating-current power signal with a low frequency supplied to the transmission line 4 from the power supply device 22 and for stopping the passage of the broadcasting signal and the command signal (hereinafter generically referred to as the high-frequency transmission signal) transmitted to the transmission line 4 from the center apparatus 2. Furthermore, opposite ends of the choke coil L1 are connected to one ends of capacitors C1 and C2 for cutting off the low-frequency alternating-current power signal and passing the high-frequency transmission signal, respectively. The other ends of the capacitors C1 and C2 are connected to a change-over switch 32 for changing between directly connecting these capacitors or connecting the capacitors via a directional coupler 30.

Additionally, when the other ends of the capacitors C1 and C2 are connected to the directional coupler 30, the high-frequency transmission signal transmitted via the input terminal Tin is transmitted toward the output terminal Tout, and a part of the high-frequency transmission signal is branched toward the branched output terminals T1 to T4.

Moreover, the choke coil L1, the capacitors C1, C2 and the change-over switch 32 are disposed on a first substrate P1 which is directly assembled to the housing of the tap device 6 together with the connectors constituting the input and output terminals Tin and Tout for connection to the transmission line or coaxial cable. The directional coupler 30 is disposed together with power supply circuits described later on a second substrate P2 which is detachably attached to the first substrate P1. Therefore, for example, when the change-over switch 32 is switched to the side opposite to the directional coupler 30, and the second substrate P2 is electrically separated from the first substrate P1, the tap device 6 merely serves as a bypass circuit for passing the alternating-current power signal and the high-frequency transmission signal via the choke coil L1 and the capacitors C1 and C2, and exerts no influence to the transmission signal running through the transmission line 4.

Subsequently, the high-frequency transmission signal branched by the directional coupler 30 is transmitted to a splitting circuit 34 (four-part splitting circuit in the embodiment), in which the signal is split in accordance with the number of the branched output terminals T1 to T4. Thereafter, the split high-frequency transmission signals are transmitted to the branched output terminals T1 to T4 via capacitors C3 to C6 which pass only the high-frequency transmission signals and block the passage of low-frequency alternating-current power signals. The signals are then transmitted to the subscribers' terminal devices connected to the branched output terminals T1 to T4.

Moreover, the signal paths leading to the branched output terminals T1 to T4 from the splitting circuit 34 are provided with latching relays (hereinafter referred to as the relays) 41 to 44 for connecting/disconnecting the signal paths, and the signal path of the high-frequency transmission signal leading to the splitting circuit 34 from the directional coupler 30 is provided with a second directional coupler 36 for branching a part of the high-frequency transmission signal passing through the path. The high-frequency transmission signal branched by the directional coupler 36 is transmitted to a receiving circuit 52.

The receiving circuit 52 selectively receives the command signal from the high-frequency transmission signals transmitted via the directional coupler 36, and demodulates the transmission data outputted by the head end controller 12. The demodulated received data is transmitted to a control circuit 54.

The control circuit 54 is mainly constituted of one chip microcomputer formed of CPU, ROM, RAM, and the like. Then, the control circuit 54 determines whether or not the address attached to the received data agrees with the address pre-allocated to the tap device 6 and therefore the command signal presently received by the receiving circuit 52 is for the tap device 6. When the addresses agree with each other, the switching command for transmitting or stopping the high-frequency transmission signals via the branched output terminals T1 to T4 is decoded from the command attached to the address, and the ON/OFF states of the relays 41 to 44 are switched according to the command.

Specifically, the tap device 6 is provided with a drive circuit 56 for energizing relay coils (not shown) incorporated in the relays 41 to 44 for switching the ON/OFF state. The control circuit 54 individually controls the ON/OFF states of the relays 41 to 44 by transmitting the control signal to the drive circuit 56.

Additionally, the splitting circuit 34, the relays 41 to 44, the capacitors C3 to C6, and the branched output terminals T1 to T4 are disposed on a third substrate P3 which is integrally assembled via screws, and the like to the second substrate P2 with the directional coupler 30 disposed thereon. The second directional coupler 36, the receiving circuit 52, the control circuit 54, the drive circuit 56, and power supply circuits 60, 70 described later are disposed together with the above-described directional coupler 30 on the second substrate P2.

Moreover, each of the relays 41 to 44 is provided with a terminal end resistance Ro which has the same impedance of 50Ω, 75Ω, or the like as that of the coaxial cable constituting the transmission line. When each of the relays 41 to 44 is switched off, the output of the splitting circuit 34 is terminated in the terminal end resistance Ro, and the high-frequency transmission signal transmitted from the splitting circuit 34 can be prevented from being reflected on the side of the splitting circuit 34, or noises generated around the splitting circuit 34 can be prevented from entering the circuit.

Furthermore, the tap device 6 is provided with the first and second power supply circuits 60 and 70 connected to the output terminal Tout via a choke coil L2. The choke coil L2 leads a part of the alternating-current power signal running through the transmission line 4 toward the power supply circuit 60 or 70, and prevents the high-frequency transmission signal from running toward the power supply circuit 60 or 70.

The first power supply circuit 60 supplies a direct-current high voltage, for example, DC 24V for driving the relays as a first power voltage V1 to the drive circuit 56, and is provided with a diode D1 for half-wave rectifying the alternating-current power signal transmitted via the choke coil L2, and an electrolytic capacitor C10 for smoothing an output or rectified power signal from the diode D1, whose one end is connected to a cathode of the diode D1 and whose other end is grounded to a ground line. Additionally, the ground line has the same potential as that of an outer conductor disposed around the core or inner conductor of the coaxial cable constituting the transmission line 4, and the signal paths in the tap devices 6 are all connected to the core of the coaxial cable.

Moreover, a collector of NPN transistor Tr1 is connected on the side of the diode D1 of the electrolytic capacitor C10, and the first power voltage V1 is transmitted to the drive circuit 56 via an emitter of NPN transistor Tr1. Moreover, a resistance R1 is disposed between the collector and the base of the NPN transistor Tr1. A cathode of Zener diode ZD1 whose anode is grounded to the ground line is connected to the base of the NPN transistor Tr1.

In the first power supply circuit 60 constituted as described above, a constant voltage circuit is formed by the Zener diode ZD1, the NPN transistor Tr1, and the resistance R1, and the first power voltage V1 transmitted to the drive circuit 56 from the emitter of the NPN transistor Tr1 is controlled to be a constant voltage obtained by adding the voltage of about 0.7V between the base and the emitter of the NPN transistor Tr1 to the breakdown voltage of the Zener diode ZD1.

Specifically, in the first power supply circuit 60, by applying a reverse bias to the Zener diode ZD1 with the power signal rectified/smoothed by the diode D1 and the electrolytic capacitor C10, the base potential of the NPN transistor Tr1 is kept to be the breakdown voltage of the Zener diode ZD1, and the output from the emitter, that is, the first power voltage V1 is controlled to be the constant voltage.

On the other hand, the second power supply circuit 70 generates a direct-current low voltage, for example, DC 5V necessary for operating the receiving circuit 52 and the control circuit 54, and supplies the voltage as a second power voltage V2 to the receiving circuit 52 and the control circuit 54. The second power supply circuit 70 is provided with a transformer 72 for lowering the voltage of the alternating-current power signal transmitted via the choke coil L2, for example, to two-ninths of the initial voltage, a diode bridge 74 for full-wave rectifying the alternating-current power signal whose voltage is lowered by the transformer 72, an electrolytic capacitor C20 disposed between a power signal output line from the diode bridge 74 and the ground line for smoothing the output or rectified power signal from the diode bridge 74, and a three-terminal regulator 76 as the constant voltage circuit for receiving the power signal smoothed by the electrolytic capacitor C20 to generate a direct-current constant voltage of DC 5V. Additionally, the three-terminal regulator 76 is set such that the second power voltage V2 can stably be generated even when the voltage of the alternating-current power signal supplied from the power supply device 22 via the transmission line 4 changes in the range of 45V to 90V.

As described above, in CATV system as the cable broadcasting system according to the embodiment, the power supply circuit to be incorporated in the tap device 6 (tap-off) for leading the broadcasting signal to the subscriber's house from the transmission line 4 is constituted of the first power supply circuit 60 and the second power supply circuit 70. For the second power supply circuit 70 to supply the second power voltage V2 to the receiving circuit 52 and the control circuit 54, after the voltage of the alternating-current power signal transmitted from the power supply device 22 via the transmission line 4 is once lowered to two-ninths of the initial voltage, the alternating-current power signal with the lowered voltage is subjected to full-wave rectification/smoothing. Subsequently, the full-wave rectified/smoothed power signal is transmitted to the three-terminal regulator 76 constituting the constant voltage circuit, so that the second power voltage V2 is generated by the three-terminal regulator 76.

Therefore, according to the tap device 6 of the embodiment, compared with the case where the second power supply circuit 70 is constituted without using the transformer 72, the voltage change of the power signal transmitted to the three-terminal regulator 76 can be suppressed to two-ninths. This can reduce the power loss in the three-terminal regulator 76, which is generated when the voltage of the alternating-current power signal transmitted to the transmission line 4 from the power supply device 22 is a high voltage, for example, of 90V in the above-mentioned voltage range. According to the tap device 6 of the embodiment, the thermal emission due to an increase of the power loss in the second power supply circuit 70 does not become a critical problem, and the power consumption of the tap device 6 can be reduced.

Moreover, in the second power supply circuit 70, since the alternating-current power signal from the transmission line 4 is introduced via the transformer 72, the transformer 72 can prevent the surge voltage or the noise signal superimposed to the transmission line 4 by lightning and other disturbances from entering the second power supply circuit 70. Therefore, in the second power supply circuit 70, the stable second power voltage V2 can constantly be generated, and the receiving circuit 52 and the control circuit 54 can stably be operated.

Furthermore, when the control circuit 54 decodes the command for the tap device 6 from the center apparatus 2 to drive the relays 41 to 44, the drive circuit 56 energizes the relay coils of the relays 41 to 44 with the first power voltage V1 which is higher than the second power voltage V2. Therefore, when the outputs of the high-frequency transmission signals via the branched output terminals T1 to T4 are switched, the currents running through the relay coils can be reduced. Additionally, the power consumption necessary for the output switching can be reduced.

Moreover, in the embodiment, since the voltage level of the first power voltage V1 for driving the relays may slightly fluctuate, the constant voltage circuit of the first power supply circuit 60 is constituted using the Zener diode. Therefore, according to the embodiment, the power supply circuit to be incorporated in the tap device 6 can inexpensively be realized in the range in which the operation of the tap device 6 is not substantially influenced.

One embodiment of the present invention has been described above, but the present invention is not limited to the above-described embodiment, and can variously be embodied.

For example, in the tap device of the embodiment, since the splitting circuit 34 is incorporated, the broadcasting signals can individually be outputted via a plurality of branched output terminals T1 to T4. However, even if the splitting circuit 34 is not incorporated and the branched output or broadcasting signal from the directional coupler 30 is outputted via one branched output terminal as it is, the present invention can be applied to the tap device in the same manner as in the embodiment.

Moreover, in the above-described embodiment, the components of the tap device 6 are mounted on three substrates P1, P2, P3. However, even if all the constituting elements are assembled onto one substrate, or even if the circuits are assembled onto two substrates, the present invention can be applied in the same manner as in the embodiment.

What is claimed is:

1. A tap device which is connected to a transmission line as one electronic equipment in a cable broadcasting system in which by supplying an alternating-current power signal for supplying an operating power to an electronic apparatus on the transmission line and a command signal for controlling the electronic apparatus via the transmission line for transmitting a broadcasting signal to a terminal side from a center apparatus, said electronic apparatus is operated by the alternating-current power signal, and said operating state thereof can be controlled from said center apparatus using said command signal comprising:

a directional coupler for branching a part of a transmission signal including at least said broadcasting signal from said transmission line, and transmitting the branched transmission signal to a terminal device via an output terminal;

a latching relay disposed in a signal path for leading the transmission signal branched by the directional coupler to said output terminal for connecting or disconnecting the signal path;

a drive circuit for driving the latching relay and switching a connected state or a disconnected state of said signal path;

a receiving circuit for receiving said command signal transmitted from said center apparatus via said transmission line;

a control circuit for extracting the command signal for the tap device from the command signals received by the receiving circuit, and transmitting a control signal to said drive circuit based on the command signal to switch the connected state or the disconnected state of said signal path by said latching relay;

a first power supply circuit for rectifying and smoothing said alternating-current power signal supplied via said transmission line, generating a first power voltage necessary for said drive circuit to drive said latching relay from the rectified and smoothed power signal, and supplying the first power voltage to said drive circuit; and a second power supply circuit for lowering the voltage of said alternating-current power signal supplied via said transmission line by a transformer, rectifying and smoothing the alternating-current power signal with the lowered voltage, generating from the rectified and smoothed power signal a second power voltage which is necessary for operating said receiving circuit and said control circuit and which is lower than said first power voltage, and supplying the second power voltage to said receiving circuit and said control circuit;

wherein said first power supply circuit comprises a constant voltage circuit for applying a reverse bias to a Zener diode with said rectified and smoothed power signal to control the first power voltage to be a voltage corresponding to a breakdown voltage of said Zener diode, and said second power supply circuit comprises a three-terminal regulator as the constant voltage circuit for generating the second power voltage from said rectified and smoothed power signal.

2. A tap device which is connected to a transmission line as one electronic equipment in a cable broadcasting system in which by supplying an alternating-current power signal for supplying an operating power to an electronic apparatus on the transmission line and a command signal for controlling the electronic apparatus via the transmission line for transmitting a broadcasting signal to a terminal side from a center apparatus, said electronic apparatus is operated by said alternating-current power signal, and the operating state thereof can be controlled from said center apparatus using said command signal comprising:

a directional coupler for branching a part of a transmission signal including at least said broadcasting signal from said transmission line, and transmitting the branched transmission signal to a terminal device via an output terminal;

a latching relay disposed in a signal path for leading the transmission signal branched by the directional coupler to said output terminal for connecting or disconnecting the signal path;

a drive circuit for driving the latching relay and switching a connected state or a disconnected state of said signal path;

a receiving circuit for receiving said command signal transmitted from said center apparatus via said transmission line;

a control circuit for extracting the command signal for the tap device from the command signals received by the receiving circuit, and transmitting a control signal to said drive circuit based on the command signal to switch the connected state or the disconnected state of said signal path by said latching relay;

a first power supply circuit for rectifying and smoothing said alternating-current power signal supplied via said transmission line, generating a first power voltage necessary for said drive circuit to drive said latching relay from the rectified and smoothed power signal, and supplying the first power voltage to said drive circuit; and a second power supply circuit for lowering the voltage of said alternating-current power signal supplied via said transmission line by a transformer, rectifying and smoothing the alternating-current power signal with the lowered voltage, generating from the rectified and smoothed power signal a second power voltage which is necessary for operating said receiving circuit and said control circuit and which is lower than said first power voltage, and supplying the second power voltage to said receiving circuit and said control circuit;

wherein the tap device further comprises a splitting circuit for splitting the transmission signal branched by said directional coupler into a plurality of transmission signals and transmitting the split transmission signals to a plurality of output terminals, and a plurality of latching relays are disposed for a plurality of signal paths leading to the plurality of output terminals from the splitting circuit, and said, control circuit individually controls the connected states or the disconnected states of the signal paths by said plurality of relays.

3. A tap device which is connected to a transmission line as one electronic equipment in a cable broadcasting system in which by supplying an alternating-current power signal for supplying an operating power to an electronic apparatus on the transmission line and a command signal for controlling the electronic apparatus via the transmission line for transmitting a broadcasting signal to a terminal side from a center apparatus, the electronic apparatus is operated by the alternating-current power signal, and the operating state thereof can be controlled from the center apparatus using the command signal comprising:

a directional coupler for branching a part of a transmission signal including at least the broadcasting signal from the transmission line, and transmitting the branched transmission signal to a terminal device via an output terminal;

a latching relay disposed in a signal path for leading the transmission signal branched by the directional coupler to the output terminal for connecting or disconnecting the signal path;

a drive circuit for driving the latching relay and switching a connected state or a disconnected state of the signal path;

a receiving circuit for receiving the command signal transmitted from the center apparatus via a second directional coupler;

a control circuit for extracting the command signal for the tap device from the command signals received by the receiving circuit, and transmitting a control signal to the drive circuit based on the command signal to switch the connected state or the disconnected state of the signal path by the latching relay;

a first power supply circuit for rectifying and smoothing the alternating-current power signal supplied via the transmission line, generating a first power voltage necessary for the drive circuit to drive the latching relay from the rectified and smoothed power signal, and supplying the first power voltage to the drive circuit; and a second power supply circuit for lowering the voltage of the alternating-current power signal supplied via the transmission line by a transformer, rectifying and smoothing the alternating-current power signal with the lowered voltage, generating from the rectified and smoothed power signal a second power voltage which is necessary for operating the receiving circuit and the control circuit and which is lower than the first power voltage, and supplying the second power voltage to the receiving circuit and the control circuit;

wherein the first power supply circuit comprises a constant voltage circuit for applying a reverse bias to a Zener diode with the rectified and smoothed power signal to control the first power voltage to be a voltage corresponding to a breakdown voltage of the Zener diode, and said second power supply circuit comprises a three-terminal regulator as the constant voltage circuit for generating the second power voltage from the rectified and smoothed power signal.

* * * * *